Patented Feb. 21, 1928.

1,659,958

UNITED STATES PATENT OFFICE.

ELOI RICARD AND HENRI GUINOT, OF MELLE, FRANCE, ASSIGNORS TO SOCIÉTÉ RICARD, ALLENET & CIE., OF DISTILLERIES DES DEUX-SEVRES, MELLE, DEUX-SEVRES, FRANCE.

PROCESS OF DEHYDRATION OF ALCOHOL FOR CARBURANTS.

No Drawing. Application filed September 27, 1923, Serial No. 665,188, and in Belgium September 30, 1922.

It is a known fact that commercial alcohol is soluble in gasoline in all proportions only when it has a high degree of purity.

When use is made of alcohol for instance at 90 degrees Gay-Lussac, it becomes necessary to add special solvents to the mixture of alcohol and gasoline.

On the contrary, it is sufficient to employ alcohol having a strength in the vicinity of 97.5–98 degrees G. L. in order that it shall be soluble in all proportions and at sufficiently low temperatures.

But the rectifying process will not produce alcohol above 96.5 G. L. In order to remove the last portions of the water which are retained with great tenacity by the alcohol, the substances in common use for the dehydration of organic liquids, such as sulphate of soda and carbonate of potash, are practically without effect. Powerful chemical reactions must be employed in order to destroy the affinity between water and alcohol, the water being removed by such substances as lime and baryta.

According to our researches, water can be removed from fuel alcohol in a sufficient and very simple manner by utilizing the reduction of the affinity between water and alcohol brought about by the addition of a suitable quantity of gasoline, and it is this process of dehydration which constitutes the object of our present invention.

The above-mentioned water-absorbing neutral salts which have practically no action upon the alcohol alone will now possess a new efficacy. When operating in suitable conditions upon mixtures of gasoline and hydrated alcohol, we are thus enabled to remove the water with facility and to obtain carburants analogous to what would be obtained by the use of the same proportions of high-degree alcohol (97.5 to 99.5 per cent).

We may employ dehydrating substances of the most varied nature, and the same should be so chosen that they will have no action upon either alcohol or gasoline, and will not dissolve in the carburant employed.

Mention may be made of carbonate of potash, carbonate of soda, sulphate of soda, sulphate of copper, chloride of magnesium, sulphate of magnesium, and the like, such substances being used singly or mixed together.

Since water is removed from the alcohol in consequence of a sort of rupture of equilibrium when the alcohol is mixed with gasoline, the conditions of the experiment are preferably modified according to the quality of the gasoline and the degree of the alcohol, so as to obtain the maximum speed of reaction.

Alcohol may thus be mixed with gasoline to which the proper quantity of dehydrating substance has been preliminarily added, or inversely the gasoline is mixed with alcohol containing the dehydrating substance, or further, we may add the dehydrating substance to the liquids which have been preliminarily mixed.

Denatured alcohol can be employed in the same manner as ordinary alcohol.

Example I.

75 volumes of light gasoline, density 0.708.
25 volumes of alcohol at 95.5 degrees G. L.

These substances are not miscible, and when used at 20 degrees centigrade they will separate into two layers.

By agitating with two parts of carbonate of potash, the mixture will instantly become clear. The point at which it becomes turbid is reduced to +4 degrees.

If the dehydration is to be still further carried out, it is simply necessary to pour off the liquid after settling and again agitate it with a small amount of carbonate of potash, and the point at which it becomes turbid is diminished below −17 degrees. This is the equivalent of a mixture effected with alcohol at 97.5–98 degrees G. L.

The rapidity of the dehydration will enable the use of a continuous operating method on a manufacturing scale.

Example II.

The mixture consists of
55 volumes of alcohol at 95.5 degrees G. L.
45 volumes of gasoline (of what is termed the touring type).
Density 0.728 at +15 degrees C.
This mixture is clear at +23 degrees C.

and becomes cloudy at +22 degrees. When the clear liquid is agitated with a small quantity of carbonate of potash, it is observed at once that the salt absorbs moisture, and it tends to adhere to the sides of the vessel; the liquid after settling will become cloudy only at +12 degrees.

By a second treatment with dry carbonate the point at which the liquid becomes turbid is reduced to +2 degrees.

*Example III.*

The mixture consists of
10 volumes of alcohol at 95.5 degrees G. L.
90 volumes of heavy gasoline, density 0.753.

At the ordinary temperature the mixture separates into two layers. When agitated with a small quantity of Solvay carbonate of soda it becomes clear, while the salt becomes viscous, showing that it has absorbed water.

After settling the carburant is clear at the ordinary temperature, but becomes cloudy at +16 degrees.

If the dehydration is to be still further carried out, the liquid is again agitated with a small amount of the Solvay salt or with carbonate of potash.

In the three examples above-mentioned, the dehydrating salt can be readily recovered. Preliminarily, we recover by distillation the very small quantity of liquid which the salt has absorbed.

Our said process for dehydration of alcohol and gasoline mixtures is rendered still more effective by operating under the following conditions.

(a) Upon continuously circulating a mixture of alcohol and gasoline (which are miscible or not) in a vessel, or several vessels in series, containing one of the said water-absorbing salts or a mixture of the same, the liquid mixture being supplied at one end of the vessel (or series of vessels) and issuing at the other end, we obtain a dehydration carried out to the extreme limit in the minimum time, inasmuch as the mixture under dehydration is constantly in the presence—and in a repeated manner—of a great excess of water-absorbing substances which are continually more anhydrous.

(b) When the mixture of alcohol and gasoline to be dehydrated is treated with small quantities of one or more liquids of such nature as to unify the heterogeneous mixtures of alcohol and gasoline, the dehydration of the alcohol will be carried out to a greater extent than without the use of such liquids; we may mention by way of example sulphuric ether, benzene and its homologues, propylic, butylic and amylic alcohol and their homologues, cyclohexanol, and like substances.

(c) A continuous circulation of the liquid mixture to be dehydrated in contact with a great excess of the water-absorbing substance contained in the said vessel or vessels will produce a progressive absorption of the water by the absorbing body from inlet to outlet of the liquid, so that the absorbing body will usually be brought to a concentrated solution at the inlet of the liquid, and will remain in the practically anhydrous state at the outlet.

Mixtures of alcohol and hydrocarbon will act in a similar manner to mixtures of alcohol and gasoline as concerns the dehydration.

*Example IV.*

Let us consider the heterogeneous mixture consisting of:
80 liters of gasoline of the above-mentioned touring type, density 0.728.
20 liters alcohol at 95 degrees.

By agitating the mixture three different times with 2 kilograms of anhydrous carbonate of potash, we obtain a clear liquid resembling the one produced by the use of 98.1 degree alcohol; we employ 6 kilograms of carbonate of potash which is brought to the state of moist salt, and this can be recovered by heating.

But if the said mixture is circulated in a set of for instance 6 vessels, each of which has 8 liters capacity and contains anhydrous carbonate of potash (mixed if necessary with a suitable inert substance such as pumice stone so as to facilitate the circulation of the liquid), the mixture issuing from the apparatus is similar to the one prepared by the use of 99.5 degree alcohol; and we therefore gain 1.4 degree G. L. relative to the method of successive agitations. Further, only 1 kilogram of carbonate of potash is employed, this having absorbed about 1 liter of water to form a concentrated solution. The carbonate of potash is recovered by heating.

*Example V.*

We employ the same mixture as in the preceding case:
80 liters of gasoline of the touring type, density 0.728.
20 liters of alcohol at 95 degrees.

If we preliminarily add to this mixture 2 liters of sulphuric ether, and agitate in three different operations with 2 kilograms of anhydrous carbonate of potash, we obtain a liquid mixture analogous to the one prepared with 98.6 degree alcohol.

The addition of a small quanity of ether has therefore increased the dehydration by 0.5 degree G. L. over the preceding process.

When the said mixture (with the addition of 2 liters of ether) is circulated in the vessels as mentioned in Example I, the resulting liquid mixture is analogous to the one produced by the use of alcohol at 98.7 degrees, so that by adding a small quantity of ether we can extend the dehydration by 0.2 degrees G. L. as compared to the process not employing ether.

*Example VI.*

Let us consider a mixture of 25 liters of 95 degree alcohol.

15 liters of commercial sulphuric ether.
60 liters of commercial gasoline.

When the mixture is dehydrated in an apparatus according to Example I, we obtain a clear liquid similar to what would be had with alcohol of 99.2 degrees G. L.

The result obtained in the case of Examples IV to VI are subject to certain variations according to the character of the gasoline products and the hydrocarbon employed.

As stated at the beginning of this specification, the special object of the present invention is the dehydration of alcohol for carburants, and it is based upon the discovery that, when the alcohol is mixed with the hydrocarbon previously to the treatment thereof with the dehydrating salts, the action of the latter is increased in a very large measure; or in other words that the absorption of the water thereby is much more rapid and more complete than when there is no hydrocarbon present. Hence the invention makes possible the very ready combining of alcohol with gasoline, or other hydrocarbon having a boiling point approximating that of gasoline, which mixture can be used directly as a carburant. The gasoline therefore serves a twofold purpose: First, it greatly expedites and facilitates the dehydration of the alcohol; and second, it makes possible by a single operation not merely the dehydration of the alcohol but the production of a carburant suitable for use in explosion engines.

It follows from what has been said above that the process has no reference to the dehydrating of gasoline or other hydrocarbons. Indeed, inasmuch as gasoline does not dissolve water it does not need to be dehydrated; though gasoline or other hydrocarbon may hold drops of water in suspension in the colloidal state, which is quite a different matter. It should be stated, however, in this connection, that the present invention is applicable specially to gasoline, and to other liquid hydrocarbons having a boiling point approximating that of gasoline.

Further it should be stated that the dehydrating agents herein specified are inactive and insoluble upon both constituents of the mixture. They serve only to absorb the water, and effect no other change.

What we claim is:

1. The process which consists in mixing alcohol with a liquid hydrocarbon and subjecting the mixture to the action of a neutral dehydrating agent.

2. The process which consists in mixing alcohol with a liquid hydrocarbon and continuously circulating the mixture over a water absorbing salt.

3. The process which consists in mixing alcohol with a liquid hydrocarbon, adding to said mixture a small quantity of unifying substance, and then subjecting the mixture to the action of a dehydrating agent.

4. The process which consists in mixing alcohol and gasoline, and then passing the mixture through a mass of a dehydrating salt.

5. The process which consists in subjecting hydrated alcohol to the action of a dehydrating agent in the presence of a liquid hydrocarbon.

6. The process of producing a carburant suitable for use in explosion engines which process consists in first mixing a liquid hydrocarbon having a boiling point approximating that of gasoline with hydrated alcohol, and then subjecting the mixture to the action of a dehydrating agent.

7. The process of producing a carburant suitable for use in explosion engines, which process consists in first mixing a liquid hydrocarbon with hydrated alcohol, and then subjecting the mixture to the action of a dehydrating agent which effects no change of condition or properties in either constituent of the mixture other than the absorption of the water.

In testimony whereof we have signed this specification.

ELOI RICARD.
HENRI GUINOT.